US008065538B2

(12) United States Patent
Odlund

(10) Patent No.: US 8,065,538 B2
(45) Date of Patent: Nov. 22, 2011

(54) NETWORK ELEMENT POWER MANAGEMENT

(75) Inventor: Camilla L. Odlund, Vancouver (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 645 days.

(21) Appl. No.: 12/196,229

(22) Filed: Aug. 21, 2008

(65) Prior Publication Data
US 2010/0050000 A1    Feb. 25, 2010

(51) Int. Cl.
G06F 1/26 (2006.01)
G06F 1/32 (2006.01)
G06F 1/18 (2006.01)
G06F 13/10 (2006.01)

(52) U.S. Cl. ........... 713/300; 713/1; 713/310; 713/320; 713/321; 713/322; 713/323; 713/324; 713/330; 713/340; 710/301; 710/104; 709/220; 709/221; 709/222

(58) Field of Classification Search .......... 713/300, 713/310, 320–324, 330, 340, 1; 709/220–222; 710/301, 104
See application file for complete search history.

(56) References Cited

U.S. PATENT DOCUMENTS

| | | | | |
|---|---|---|---|---|
| 5,881,300 A | * | 3/1999 | Chen | 713/340 |
| 2003/0033547 A1 | * | 2/2003 | Larson et al. | 713/300 |
| 2007/0245162 A1 | * | 10/2007 | Loffink et al. | 713/300 |
| 2008/0052437 A1 | * | 2/2008 | Loffink et al. | 710/302 |
| 2009/0193276 A1 | * | 7/2009 | Shetty et al. | 713/340 |

OTHER PUBLICATIONS

"Power Management for Catalyst 6000 Series Switches", Cisco Systems, Apr. 30, 2007, 10 pages.
Pages from "Release Notes for the SmartEdge OS, Release 6.1.1.3", Part No. 220-0747-01, Redback Networks, Sep. 25, 2007, 3 pages.
Pages from "Basic System Operations Guide, Release 6.1.1", Part No. 220-0749-01, Redback Networks, Sep. 25, 2007, 3 pages.
Pages from "SmartEdge Router Hardware Guide, Release 6.1.1", Part No. 220-0716-03, Redback Networks, Sep. 25, 2007, 12 pages.
"Field Notice: a Serial EEPROM Value May Be Configured Incorrectly on Some WS-X6748-GE-TX Linecards", Cisco Systems, Aug. 3, 2004, 3 pages.

* cited by examiner

Primary Examiner — Thomas Lee
Assistant Examiner — Fahmida Rahman
(74) Attorney, Agent, or Firm — Blakely Sokoloff Taylor & Zafman, LLP

(57) ABSTRACT

A method and apparatus for power management of a network element. In one embodiment of the invention, a networking card configuration request is received for a type of networking card irrespective of a networking card of that type being inserted into the network element. The network element does not enable networking cards unless they are successfully configured and inserted. The amount of power that the networking card consumes is determined without reading a power consumption value from that card. If it is determined that allowing that type of networking card to be configured would exceed the power capacity of the network element, the configuration request is denied and the networking card, if or when inserted remains disabled and is not powered up. However, if allowing that type of networking card to be configured would not exceed the power capacity, the configuration request is accepted, the amount of power that type of networking card consumes is allocated, and the card will be enabled when inserted.

22 Claims, 6 Drawing Sheets

| CHASSIS TYPE 510 | POWER CAPACITY 520 | POWER AVAILABLE 530 | SLOT ARRAY 540 |
|---|---|---|---|
| ACTIVE/ STANDBY, 6 SLOTS | 1000 WATTS | 300 WATTS | 690, 691, 692, 693, 694, 695, 696 |

CHASSIS POWER RECORD 132

| SLOT 550 | CARD TYPE 560 | POWER CONSUMPTION 570 | POWERED DOWN STATE? 580 |
|---|---|---|---|
| CONTROL CARD SLOT 690 | XCRP3 | 50 WATTS | NO |
| CONTROL CARD SLOT 691 | EMPTY | 50 WATTS | NO |
| LINE OR SERVICE CARD SLOT 692 | 12 PORT ETH | 75 WATTS | NO |
| LINE OR SERVICE CARD SLOT 693 | UNCONFIGURED | 10 WATTS | NO |
| LINE OR SERVICE CARD SLOT 694 | 62 PORT ETH | 200 WATTS | NO |
| LINE OR SERVICE CARD SLOT 695 | ASE | 225 WATTS | NO |
| LINE OR SERVICE CARD SLOT 696 | EMPTY | 10 WATTS | NO |

SLOT ARRAY 540

FIG. 5

NETWORK ELEMENT POWER MANAGEMENT

BACKGROUND

1. Field

Embodiments of the invention relate to the field of networking, and more specifically to the power management of network elements.

2. Background

A network element (e.g., a router, switch, bridge, etc.) is a piece of networking equipment, including hardware and software that communicatively interconnects other equipment on the network (e.g., other network elements, computer end stations, etc.). Network elements typically include one or more networking cards (e.g., one or more control cards, one or more line cards, one or more service cards, etc.) inserted into a chassis. For example, many network elements include an active control card and a synchronized standby control card to provide redundancy. The control cards perform signaling, routing (including creation of and/or management of routing tables), bridging (including creation of and/or management of bridging tables), connection setup, session setup, etc. The line cards handle packet processing including forwarding and/or switching at high speed.

A network element has a limited power capacity and each networking card may require a different amount of power. For example, a quad processing core control card requires more power than a dual processing core control card. The network element may overheat causing electrical equipment to melt and/or may potentially cause a fire if the power capacity is exceeded.

Some network elements require a power consumption value to be programmed (e.g., in an EEPROM) in the networking cards. When the networking card is inserted into the chassis, the power consumption value is read. If the network element determines that sufficient power is available the networking card is powered up. However, if the network element determines that there is not sufficient power (e.g., the power capacity would be exceeded if this card is powered up), the networking card is denied power which disables the networking card. If the power capacity decreases, the network element powers down networking cards in descending order, starting with the highest number slot of the chassis. If the power capacity is increased, the powered down networking cards are brought back up.

BRIEF DESCRIPTION OF THE DRAWINGS

The invention may best be understood by referring to the following description and accompanying drawings that are used to illustrate embodiments of the invention. In the drawings:

FIG. 5 illustrates an exemplary chassis power record according to one embodiment of the invention.

DETAILED DESCRIPTION

Figure 1:
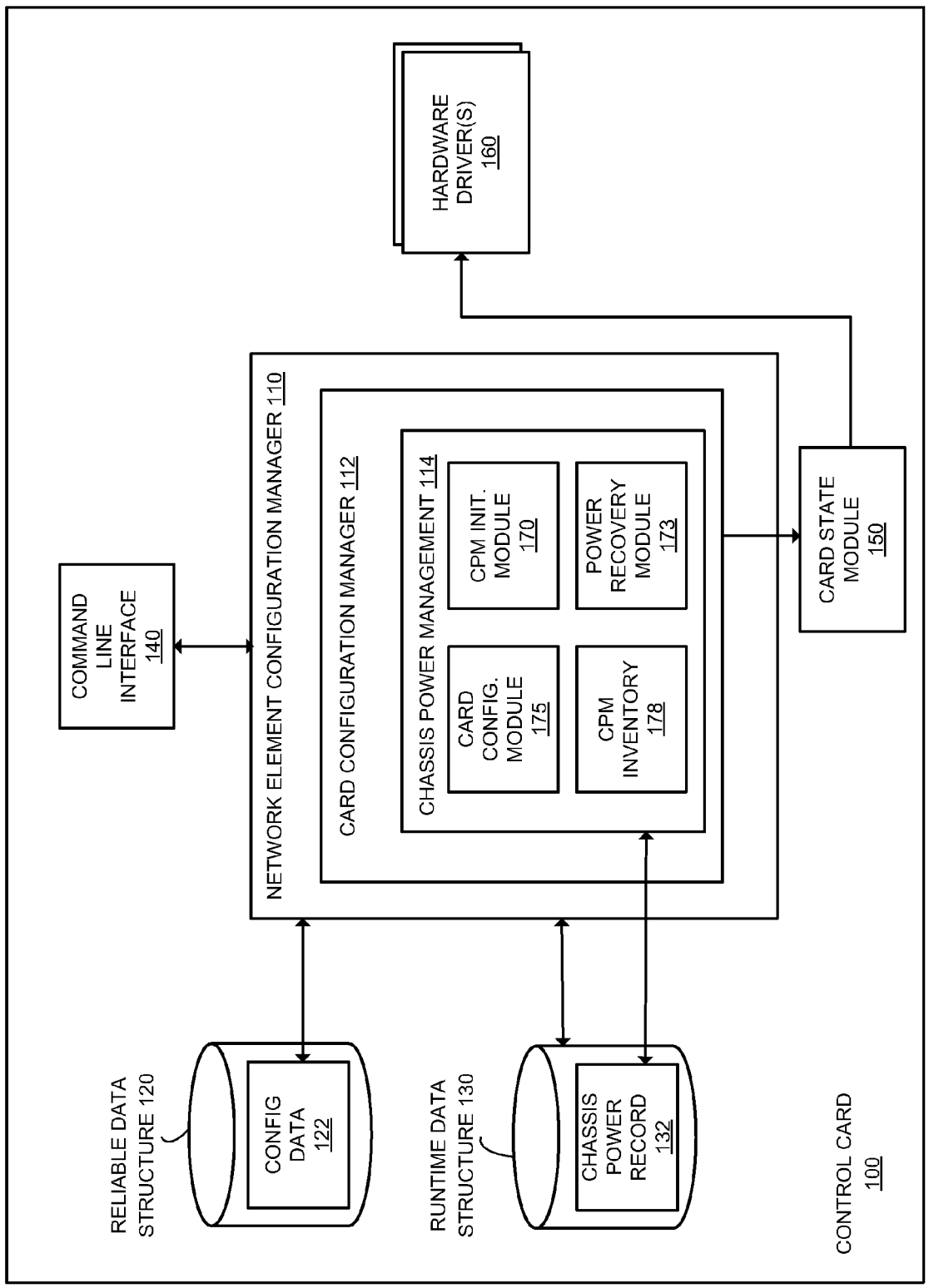
FIG. 1 illustrates an exemplary control card of a network element implementing power management according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and with other electronic devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Some network elements are multiple services network elements that provide support for multiple networking functions (e.g., routing, bridging, switching, Layer 2 aggregation, and subscriber management or any combination of routing, bridging, switching, Layer 2 aggregation, and subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network (wired or wirelessly) to edge network elements, which are coupled through one or more core network elements to the server computing end stations.

A method and apparatus for power management of a network element including preventing the network element from powering up a hardware configuration that overloads the power capacity of the network element is described. In one embodiment of the invention, the network element supports pre-provisioning of a hardware configuration such that an operator may determine whether a particular combination of one or more control cards and one or more line cards and/or service cards exceeds the power capacity of the network element irrespective of whether that combination of cards is physically inserted into the network element. The power consumption values of cards that are supported by the network element are stored within the network element. Thus, an operator does not need the physical line cards and/or service cards to determine whether the network element has enough available power to support that hardware configuration. In addition, the power consumption values of the cards may be updated with a release patch or release upgrade of the network element.

Figure 6:
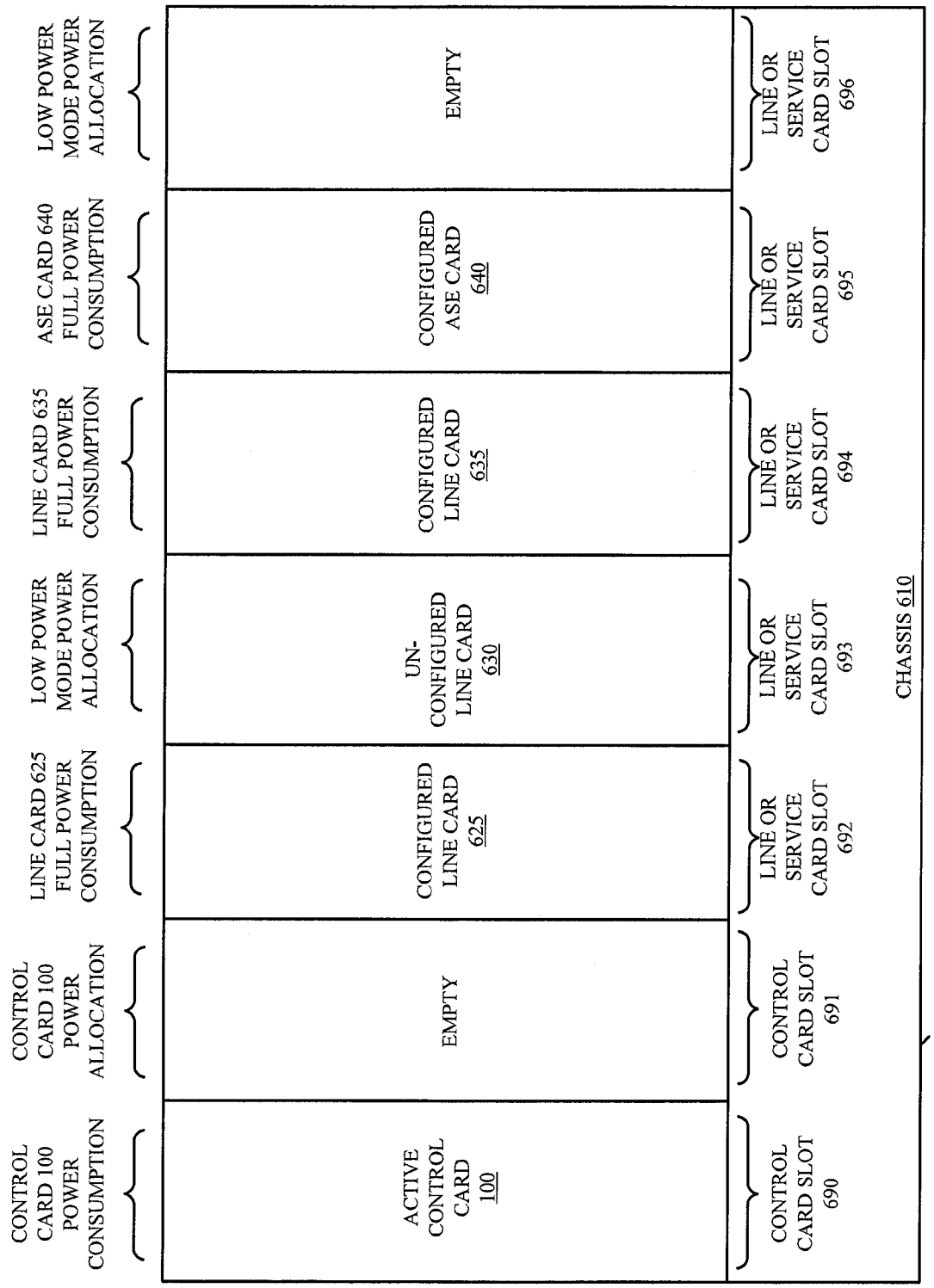
FIG. 6 illustrates an exemplary network element according to one embodiment of the invention.

FIG. 1 illustrates an exemplary control card of a network element implementing power management according to one embodiment of the invention. FIG. 1 will be described with reference to the exemplary embodiment of FIG. 6. However, it should be understood that the embodiment of FIG. 1 may be implemented by different embodiments other than those discussed with reference to FIG. 6. FIG. 6 illustrates an exemplary network element 600 according to one embodiment of the invention. The network element 600 includes the chassis 610 which includes the control card slots 690 and 691 (e.g., to receive an active control card and a standby control card) and the line or service card slots 692-696. It should be understood that the architecture of the network element 600 is exemplary, and other architectures may be used in embodiments of the invention described herein (e.g., the number of card slots may be different in some embodiments of the invention, the combination of card slots may be different in some embodiments of the invention, a single control card slot may be used, etc.). The control card 100 is inserted into the control card slot 690, the control card slot 691 is empty, the line card 625 is inserted into the line or service card slot 692, the line card 630 is inserted into the line or service card slot 693, the line card 635 is inserted into the line or service card slot 694, the service card 640 is inserted into the line or service card slot 695, and the line or service card slot 696 is empty.

The control card 100 illustrated in FIG. 1 includes the command line interface 140, the network element configuration manager 110, one or more hardware drivers 160, the card state module 150, the reliable data structure 120, and the runtime data structure 130. The network element configuration manager 110 includes the card configuration manager 112. The card configuration manager 112 includes the chassis power management (CPM) 114. While in one embodiment of the invention the reliable data structure 120 and the runtime data structure 130 are implemented as databases, in alternative embodiments of the invention they are implemented differently (e.g., linked lists, tries, arrays, lists, graphs, etc.).

The network element configuration manager 110 is coupled with the reliable data structure 120 and the command line interface 140. According to one embodiment of the invention, the network element configuration manager 110 controls all system configurations and stores those configurations in the configuration data 122 of the reliable data structure 120. For example, the network element configuration manager 110 receives transactions (e.g., configuration requests) from an operator via the command line interface 140. These configurations may be performed for a variety of reasons, including at setup, responsive to changes in network policies, account modification, account deletions, account addition, etc. The configurations are processed by a particular component manager that corresponds to the configuration. Each component manager corresponds to a backend process or module. For example, the card configuration manager 112 is a component manager of the card state module 150. Although not illustrated in FIG. 1, it should be understood that the network element configuration manager 110 may include many other component managers in addition to the card configuration manager 112. For example, the network element configuration manager 110 may include an AAA (authentication, authorization, and accounting) component manager coupled with an AAA backend process and the reliable data structure 120. If supported, the information in the configuration data 122, among other things, may be synchronized with a standby control card.

The network element configuration manager 110 is further coupled with the runtime data structure 130. In contrast with the reliable data structure 120, the runtime data structure 130 stores data that is created and/or modified at runtime. For example, information that is configured or provisioned by an operator is typically stored in the reliable data structure 120 while the information stored in the runtime data structure 130 is generated by the network element at runtime. Typically, each component manager is coupled with the runtime data structure 130. For example, the card configuration manager 112 is coupled with the runtime data structure 130. Specifically, the CPM 114 is coupled with the chassis power record 132.

The card state module 150 is coupled with the one or more hardware drivers 160. The one or more hardware drivers 160 is software responsible for directly controlling hardware devices (e.g., line cards, service cards, etc.). For example, the hardware drivers 160 may control hardware initialization, access control, and interrupt handling, etc.

Figure 2:
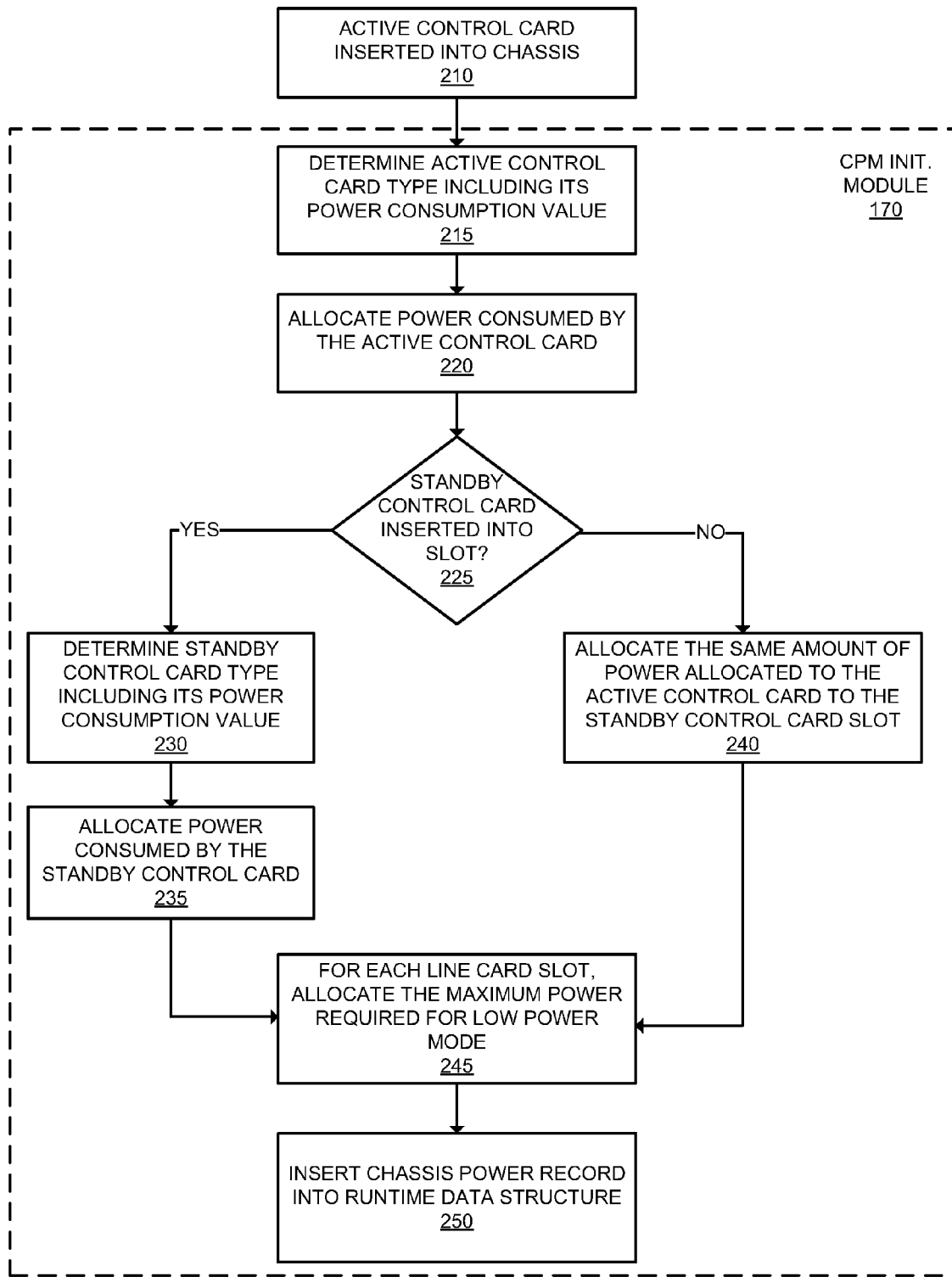
FIG. 2 is a flow diagram illustrating initializing the power management of FIG. 1 according to one embodiment of the invention.

The CPM 114 includes the CPM initialization module 170, the power capacity exceeded recovery module 173 (hereinafter "power recovery module" 173), the card configuration module 175, and the CPM inventory 178. The CPM initialization module 170 and the card configuration module 175 may be performed by processing logic that may include hardware (e.g., circuitry, dedicated logic, etc.), software executed by hardware, or a combination of both. FIG. 2 is a flow diagram illustrating operations performed by the CPM initialization module 170 to initialize the CPM 114 according to one embodiment of the invention. However, it should be understood that the operations of FIG. 2 can be performed by embodiments of the invention other than those discussed with reference to the CPM initialization module 170, and the embodiments discussed with reference to the CPM initialization module 170 can perform operations different than those discussed with reference to FIG. 2. It should be understood that the operations performed by the CPM initialization module 170 may be performed by processing logic that includes hardware (e.g., dedicated logic, programmable logic, microcode, etc.), software, or a combination of both.

At block 210, an active control card is inserted into a slot of the chassis. For example, with reference to FIGS. 1 and 6, the control card 100 is inserted into the chassis 610 of the network element 600. For example, an operator physically installs the control card 100 into the chassis 610. The control card 100 is the first control card installed in the network element 600 and is thus, at least initially, the active control card. The network element 600 additionally includes a standby control card slot 620 to receive a standby control card. It should be understood that the network element 600 does not operate correctly if at least one control card is not inserted into the network element 600. According to one embodiment, the card state module 150 detects when the control card 100 is installed in the network element 600.

According to one embodiment of the invention, upon inserting the control card 100 into the chassis, and power being applied to the network element, the control card 100 initializes automatically without operator intervention. As part of this initialization, the control card 100 determines a power capacity of the network element 600 and records the power capacity into the chassis power record 132. For example, in one embodiment of the invention, the power capacity of the network element is read from the CPM inventory 178. The power capacity is the amount of power that hardware of the network element 600 may safely draw. It should be understood that if the power capacity is exceeded, the network element 600 may overheat and may potentially cause a fire.

FIG. 5 illustrates an exemplary chassis power record 132 according to one embodiment of the invention. The chassis power record 132 includes the chassis type field 510, which indicates the type of the chassis (e.g., how many slots dedicated for control cards, how many slots dedicated for line cards and/or service cards, redundancy configuration, etc.), the power capacity field 520, the power available field 530, which indicates the amount of power currently available (e.g., not allocated), and the slot array 540. The slot array 540 will be described in greater detail later herein. Of course, it should be understood that the fields illustrated in FIG. 5 are exemplary, different and/or additional fields may be used in embodiments of the invention. For example, the chassis power record 132 may also include a tolerance factor, the amount of power consumed by equipment other than networking cards (e.g., fans and/or other cooling mechanisms requiring power), and account for multiple power zones. A power zone is a closed circuit section of a chassis powered by the same power source (e.g., a grouping of one or more slots powered by the same power source). Thus, if the network element has two power zones, a first power source supplies power to one of the power zones and a second power source applies power to the other power zone. Flow moves from block 210 to block 215.

At block 215, the type of the active control card 100 is determined. For example, the type includes the processor configuration (e.g., single core, dual-core, multiple core), processing capabilities (e.g., speed of the processor, memory size, etc.), power consumption, etc. In one embodiment of the invention, the card state module 150 determines an identification of the control card 100 by reading a memory (e.g., a non-volatile memory such as EEPROM (Electrically Erasable Programmable Read-Only Memory), etc.) and passes the result to the CPM 114. The CPM initialization module 170 then accesses the CPM inventory 178 with the identification to determine the power consumption of that type of control card. In one embodiment of the invention the CPM inventory 178 includes the power capacity of each possible chassis type, the tolerance factor for each chassis type, the amount of power consumed by equipment other than networking cards for each chassis type (e.g., fans and/or other cooling mechanisms), and the power consumption values of each possible control card, line card and/or service card supported by the network element.

In an alternative embodiment of the invention, the card state module 150 reads a power consumption value from a memory (e.g., a non-volatile memory such as EEPROM) from the control card 100 and passes the power consumption value to the CPM initialization module 170. Flow moves from block 215 to block 220.

At block 220, the amount of power consumed by the active control card 100 is allocated from the amount of power available. For example, if the power capacity of the network element 600 is 1000 watts of which 900 watts is available and the active control card 100 consumes 50 watts, 50 watts is allocated from 900 available watts for the active control card 100, thus reducing the amount of available power to 850 watts. According to one embodiment of the invention, the allocation of power for the active control card 100 is reflected in the chassis power record 132. For example, the value in the power available field 530 is reduced according to the amount allocated for the active control card 100. Flow moves from block 220 to block 225, where a determination is made whether a standby control card has been inserted into a slot of the chassis 610. If a standby control card has not been inserted, flow moves to block 240. However, if a standby control card is inserted, then flow moves to block 230. With reference to FIG. 6, the standby control card slot 620 is empty (thus no control card is inserted into the control card slot 691). It should be understood that if the network element does not support redundant control cards (i.e., the network element supports only a single control card), block 225 is omitted and flow moves from block 220 to block 245.

At block 240, the same amount of power allocated for the active control card 100 is allocated for the standby control card slot. For example, if 50 watts is allocated to the control card 100, 50 watts is allocated to the standby control card slot. According to one embodiment of the invention, the allocation of power for the standby card slot is reflected in the chassis power record 132 (e.g., by reducing the value in the power available field 530). It should be understood that typically, network elements that support dual control cards in an active/standby mode require that the standby control card match the active control card. In other words, the type of the standby control card including its power consumption value typically matches the type and power consumption value of the active control card. Therefore, inserting a standby control card into the network element at a later time does not affect the available amount of power since that amount of power was previously allocated. However, some network elements may allow the type of the standby control card to be different than the type of the active control card. In addition, in an alternative embodiment of the invention, an operator may choose to override the power allocation for the standby control card slot (e.g., if the operator intends not to insert a standby control card into the network element). Control moves from block 240 to block 245.

At block 230, where a standby control card is inserted, the type of the standby control card (including the power consumption value of the standby control card) is determined in a similar fashion as was determined for the type of the active control card in block 215. For example, in one embodiment of the invention, the card state module 150 determines an identification of the standby control card by reading a memory (e.g., a non-volatile memory such as EEPROM, etc.) and passes the result to the CPM 114. The CPM initialization module 170 then accesses the CPM inventory 178 with the identification to determine the type of control card. In an alternative embodiment of the invention, the card state module 150 reads a power consumption value from a memory (e.g., a non-volatile memory such as EEPROM) from the standby control card and passes the power consumption value to the CPM initialization module 170. Sometime after the type of the standby control card is determined, flow moves from block 230 to block 235. At block 235, the amount of power consumed by the standby control card is allocated from the available power of the network element in a similar fashion as described with reference to block 220, including modifying the chassis power record 132. Flow moves from block 235 to block 245.

At block 245, for each line card slot, the maximum power required for low power mode of a line card or service card is allocated from the available power of the network element. For example, according to one embodiment of the invention, the allocation of power for each line card is reflected in the chassis power record 132 (e.g., by reducing the value in the power available field 530). According to one embodiment of the invention, the low power mode allows for a reduced set of features for a line card. For example, in some embodiments of the invention, the packet processors (e.g., ingress and/or egress packet processors) are not powered during low power mode, yet a memory (e.g., EEPROM) may be read, a FPGA (Field Programmable Gate Array) may be accessed, and LED (light emitting diodes) may flash, and/or any combination of the above. In some embodiments of the invention, a line card or service card automatically enters low power mode upon insertion into the network element, and will not transition to its full power mode (where the card is fully functional) unless successful configured. Therefore, the network element does not power up unconfigured cards and thus unconfigured cards may be inserted into the network element without impacting the power budget of the network element. After the card is configured (which will be described in greater detail herein), the card state module 150 instructs the hardware driver to enable the card upon insertion. An exemplary card configuration method is described with reference to FIG. 3. Flow moves from block 245 to block 250, where the updated chassis power record 132 is inserted into the runtime data structure 130.

Figure 3:
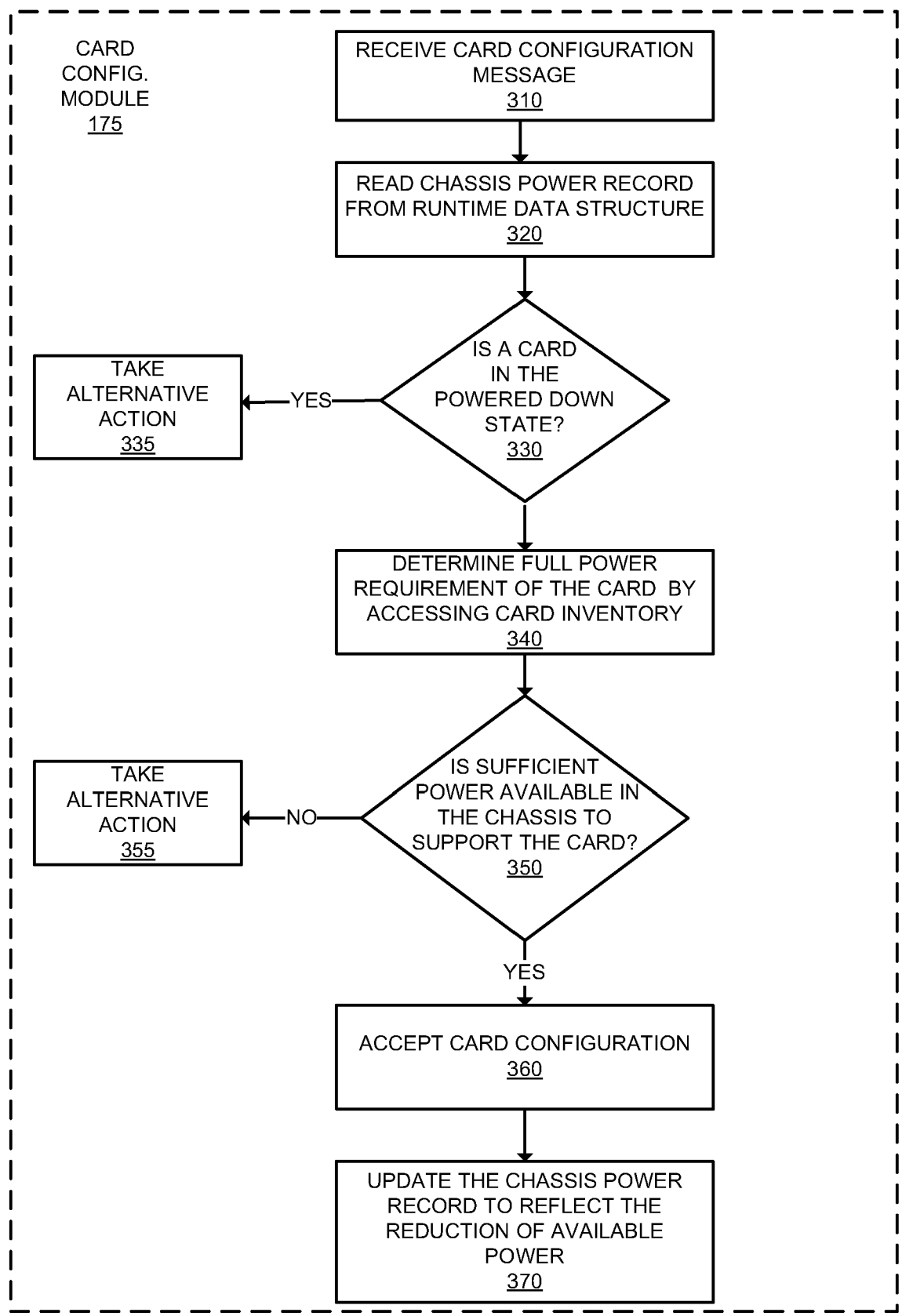
FIG. 3 is a flow diagram illustrating an exemplary networking card configuration according to one embodiment of the invention.

Sometime after the network element and the CPM 114 is initialized, an operator of the network element will configure one or more networking cards (e.g., one or more control cards (e.g., a standby), one or more line cards, and/or one or more service cards). FIG. 3 is a flow diagram illustrating operations performed by the card configuration module 175 according to one embodiment of the invention. However, it should be understood that the operations of FIG. 3 can be performed by embodiments of the invention other than those discussed with reference to the card configuration module 175, and the embodiments discussed with reference to the card configuration module 175 can perform operations different than those discussed with reference to FIG. 3. It should be understood that the operations performed by the card configuration module 175 may be performed by processing logic that includes hardware (e.g., dedicated logic, programmable logic, microcode, etc.), software, or a combination of both.

At block 310, a card configuration message request is received by the card configuration module 175. According to one embodiment of the invention, an operator of the network element issues the card configuration message request via the CLI 140. The card configuration message request indicates the type of card and a slot for the card. According to one embodiment of the invention, the network element supports pre-provisioning. That is, an operator may request for a card to be configured without the card physically being inserted into the chassis. Therefore, the operator may assess different possible card combinations for the chassis without physically having those cards inserted into the chassis. Thus, the card configuration message request received during block 310 may or may not correspond with a card that is inserted into the chassis. The CLI 140 passes the card configuration request to the network element configuration manager 110. The network element configuration manager 110 parses the request and determines to pass the request to the card configuration manager 112. The card configuration manager 112 determines whether that type of card is supported by the network element (e.g., by accessing a file that lists the types of card supported by the network element). If the card is not supported, an error message may be displayed to the operator via the CLI 140. If the card is supported, the card configuration manager 112 passes the request to the card configuration module 175. Flow moves from block 310 to block 320.

At block 320, the chassis power record 132 is read from the runtime data structure 130. Thus, the card configuration module 175 accesses the runtime data structure 130 to read the chassis power record 132. As described above, the chassis power record 132 includes the chassis type field 510, the power capacity field 520, the power available field 530, and the slot array 540. The slot array 540 includes the slot field 550, the card type field 560, the power consumption field 570, which identifies how much power is consumed by the configured card, and the powered down state field 580, which indicates whether the card is in a powered down state which will be described in greater detail later herein. For illustration purposes, the values in the slot array 540 correspond with the configuration illustrated in FIG. 6. For example, the active control card 100 is a XCRP3 card that consumes 50 watts and is not in a powered down state, the line card 625 is a 12 port Ethernet line card that consumes 75 watts and is not in a powered down state, the line card 630 is a 10 port GigEthernet line card that consumes 150 watts and is not in a powered down state, the line card 635 is a 62 port Ethernet card that consumes 200 watts and is not in a powered down state, and the service card 640 is an ASE card that consumes 225 watts and is not in a powered down state.

Flow moves from block 320 to block 330, where a determination is made whether any configured card is in the powered down state. According to one embodiment of the invention, a card is transitioned into the powered down state when the power capacity of the network element has been exceeded, which will be described in greater detail with respect to FIG. 4. According to one embodiment of the invention, the card configuration module 175 accesses the chassis power record 132 and determines if any of the entries of the slot array 540 indicate a powered down state for a card. If at least one card is in the powered down state, then flow moves to block 335 where alternative action is taken (e.g., the card configuration request is denied and the network element displays a card configuration request denied message, etc.). However, if there are no cards in the powered down state, then flow moves to block 340.

At block 340, the power consumption value required by the card in its full power mode is determined. According to one embodiment of the invention, the card configuration module 175 accesses the CPM inventory 178 to determine the card's power consumption value. The CPM inventory 178 includes, among other things, power consumption values of each possible networking card (control card, line card, service card, etc.) that is supported by the network element. Thus, it should be understood that unlike typical network elements, the power consumption values of the supported networking cards is stored within the network element. That is, in typical network elements, power consumption values of particular networking cards are stored on those networking cards, typically in an EEPROM. Therefore, unlike typical network elements, a card does not have to be physically inserted to determine the power consumption value of that card type. Flow moves from block 340 to block 350.

At block 350, a determination is made whether sufficient power is available to support the configuration of the card. For example, the card configuration module 175 compares the power consumption value of the card with the value of the power available field 530 to determine if there is sufficient power. If the power consumption value of the card is less than the value of the power available field 530, then there is sufficient power to configure the card. However, if the power consumption value of the card is greater than the value of the power available field 530, then there is not sufficient power to configure the card. If there is not sufficient power, then flow moves to block 355 where alternative action is taken (e.g., the card configuration request is denied and the operator is displayed a card configuration request denied message, etc.). If there is sufficient power, then flow moves to block 360 where the card configuration is accepted. Additionally, a successful configuration message may be displayed to the operator. Flow moves from block 360 to block 370 where the chassis power record 132 is updated to reflect the reduction of the available power.

Thus, embodiments of the invention allow an operator to determine whether there is enough power available for the network element to support a particular configuration of networking cards. In addition, unlike typical network elements, the operator does not need the physical networking cards in order to determine whether a particular card configuration will have enough power to be supported by the network element. For example, in a typical network element, since the networking cards store the power consumption values (typically in an EEPROM), an operator must physically insert a card into the chassis in order for the network element to determine the power consumption value of that card and whether the card may be accepted.

In addition, embodiments of the invention allow for a decoupling of operational staff and service staff of the network element. Typically, the operational staff waits for the service staff to insert the networking cards into the network element before they may configure them and before they are ready to use, which may be a significant amount of time (e.g., the operational staff and the service staff may be in different locations). However, since embodiments of the invention allow operators of the network element to pre-provision (configure the cards without the cards physically being inserted in the network element), soon after the cards are physically inserted by the service staff the cards will be operational (assuming the cards that are inserted are configured).

In addition, since the power consumption values of the networking cards is stored within the network element, typically in software, updating the power consumption values is easier than typical networking cards. For example, as previously described, typically, a power consumption value is stored within an EEPROM of the networking card. Typically the networking card and/or the network element must be taken offline to update the power consumption values stored in the networking card. In contrast, embodiments of the invention allow the power consumption values to be updated via a software upgrade (e.g., such as a release patch or a release upgrade) which may not require the network element to be taken offline.

In certain circumstances, the power capacity of the network element may be exceeded. For example, as previously described, the same amount of power that is allocated to the active control card is allocated to the standby control card slot (thus the network element is expecting the standby control card to be the same type as the active control card). However, if the operator inserts a standby control card of a different type, and the standby control card consumes more power than was allocated, the power capacity may be exceeded. Of course, there may be other reasons for the power capacity of the network element to be exceeded.

Figure 4:
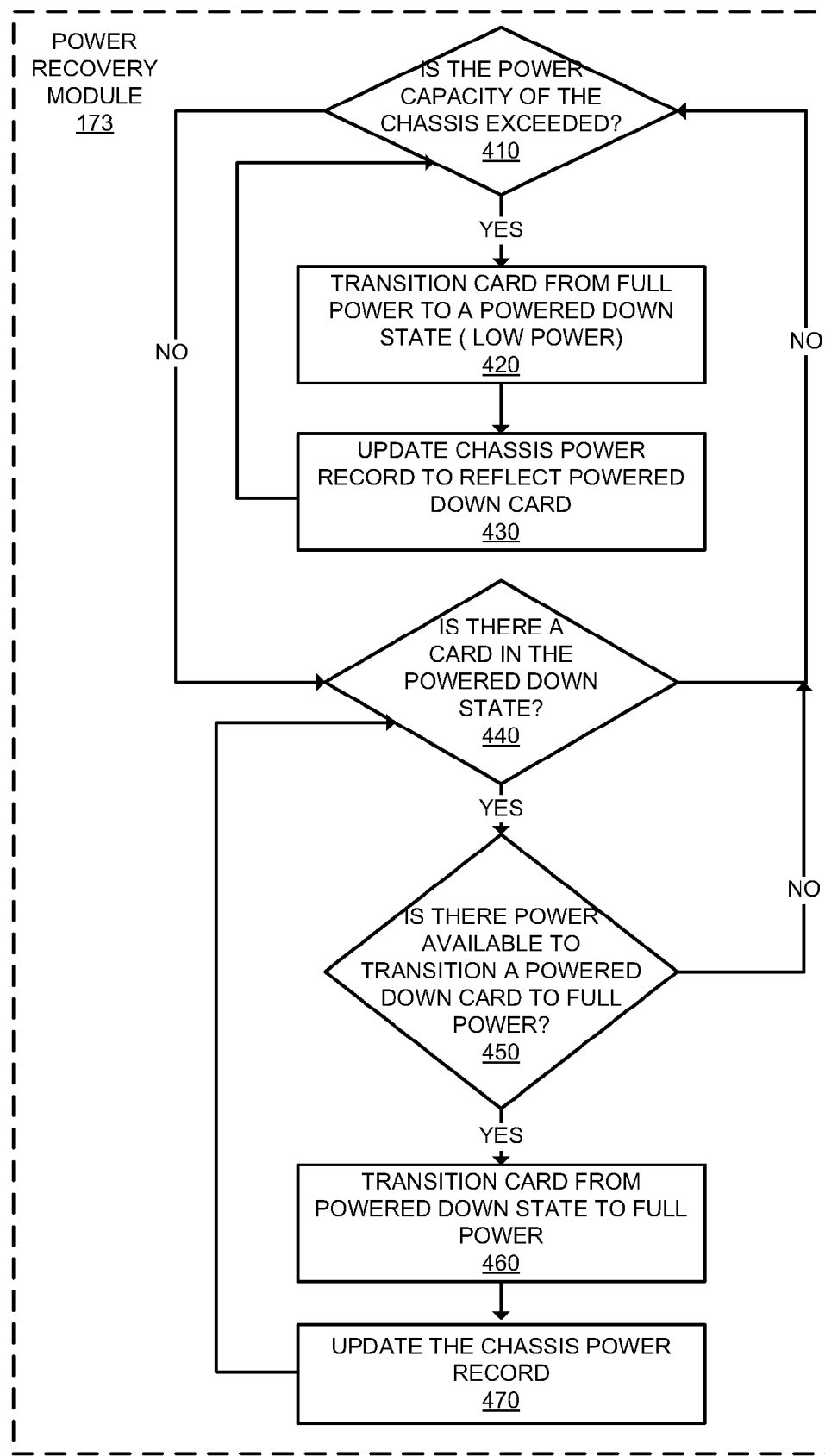
FIG. 4 is a flow diagram illustrating an exemplary method to handle power capacity overload according to one embodiment of the invention.

FIG. 4 is a flow diagram illustrating operations performed by the power recovery module 173 according to one embodiment of the invention. However, it should be understood that the operations of FIG. 4 can be performed by embodiments of the invention other than those discussed with reference to the power recovery module 173, and the embodiments discussed with reference to the power recovery module 173 can perform operations different than those discussed with reference to FIG. 4. It should be understood that the operations performed by the power recovery module 173 may be performed by processing logic that includes hardware (e.g., dedicated logic, programmable logic, microcode, etc.), software, or a combination of both.

At block 410, a determination is made whether the power capacity of the chassis is exceeded. If the power capacity has not been exceeded, then flow moves to block 440. If the power capacity has been exceeded, then flow moves to block 420. According to one embodiment of the invention, if the power capacity of the chassis has been exceeded, a power capacity exceeded alarm is raised within the network element.

At block 420, the power recovery module 173 transitions one of the configured cards (one of the line cards or service cards) from its full powered mode to its low power mode. There are many different mechanisms that may be used in embodiments of the invention for selecting which card to power down. For example, the card that consumes the most power may be selected for transitioning to the low power mode. As another example, the card that consumes the least power may be selected for transitioning to the low power mode. As yet another example, the cards may be sequentially powered down according to slot number (either descending or ascending). According to one embodiment of the invention, the power recovery module 173 simulates a card de-provision by notifying the card state module 150 that the card has been un-configured. The card state module 150 then notifies the rest of the system that the card has been un-configured. For example, since a card is in a low-power mode until the hardware driver enables that card, if the power capacity is exceeded, the card state module instructs the hardware driver(s) 160 to disable that card. Thus the card appears to be disabled at the hardware level but remains in the configuration data 122 so that no configuration is deleted so that the card may be automatically re-enabled with the current configuration if more power becomes available. Flow moves from block 420 to block 430.

At block 430, the chassis power record 132 is updated to reflect the powered down card. For example, the value of the power available field 530 is increased accordingly and the value in the powered down state field 580 for the powered down card is modified to indicate a powered down state. Flow moves from block 430 back to 410 to determine if more cards need to be powered down.

At block 440, a determination is made whether there is a card in the powered down state. If no card is in the powered down state, then flow moves back to block 410. However, if a card is in the powered down state, then flow moves to block 450. At block 450, a determination is made whether there is enough power available to transition a powered down card to full power. Thus, after some time, there may be enough power available to transition the powered down cards to their full power mode (e.g., the removal of an incorrect standby control card, etc.). If there is sufficient power, then flow moves to block 460. However, if there is not sufficient power, then flow moves back to block 410.

At block 460, the power recovery module 173 transitions one of the powered down cards from its lower power mode to its full power mode. As described previously, in one embodiment of the invention cards are not in its full power mode unless the hardware driver(s) have enabled the card. Therefore, in one embodiment of the invention, the power recovery module 173 notifies the card state module 150 that the card is configured and the card state module 150 instructs the hardware driver(s) 160 to enable that card.

There are many different mechanisms that may be used in embodiments of the invention for selecting which powered down card to transition to full power mode. For example, the powered down card that consumes the most power may be selected for transitioning to its full power mode. As another example, the powered down card that consumes the least amount of power may be selected for transitioning to its full power mode. As yet another example, the powered down cards may be sequentially transitioned to their respective full power mode (either descending or ascending). Flow moves from block 460 to block 470, where the chassis power record 132 is updated. Flow moves from block 470 to block 440.

In one embodiment of the invention, a tolerance factor may be used when determining if the power capacity of the network element has been exceeded. For example, a tolerance factor of 10% (or any other percentage) may be used when comparing the available power of the network element with the power consumption value of a networking card corresponding to a card configuration request. In some embodiments of the invention the tolerance factor increases the amount of available power whereas in other embodiments of the invention the tolerance factor decreases the amount of available power.

In one embodiment of the invention, the network element supports multiple power zones each including a separate power budget and are independently managed by the chassis power management 114. Each power zone may include the same power budget or a different power budget. The power capacity of one power zone may be exceeded while the power capacity of other power zones may not be exceeded. If the power capacity is exceeded in one zone, only the cards in that zone will be powered down until the amount of power allocated is below capacity. In some embodiments of the invention, if at least one zone has one or more power-denied cards (i.e., a card has transitioned from its full power mode to the low power mode), then no cards may be provisioned in any of the zones.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for power management of a network element having a plurality of slots for receiving a plurality of networking cards respectively, the method comprising:
   receiving a networking card configuration request for a type of networking card irrespective of a networking card of that type being inserted into one of the plurality of slots, wherein the networking card is not enabled unless successfully configured and inserted into the network element;
   determining an amount of power that type of networking card consumes when configured without reading a power consumption value from a networking card of that type;
   determining whether allowing that type of networking card to be configured would exceed a power capacity of the network element, wherein if the power capacity is exceeded, denying the configuration request of that type of networking card, and wherein if the power capacity is not exceeded, performing the following:
      accepting the configuration request of that type of networking card, and
      allocating the amount of power that type of networking card consumes; and
   determining power consumption of the networking cards has exceeded the power capacity of the network element;
   upon determining the power consumption of the networking cards has exceeded the power capacity of the network element, performing the following:
      powering down enough of one of one or more line cards or service cards to reduce the power consumption below the power capacity,
      preventing configuration of any line cards or service cards while at least one of the line cards or service cards is in a powered down state, and
      upon determining that power has become available, powering up the powered down cards.

2. The method of claim 1, wherein the determining the amount of power that type of networking card consumes when configured includes accessing a data structure stored on the network element containing power consumption values for types of networking cards supported by the network element.

3. The method of claim 1, wherein the networking card configuration request originates from an operator of the network element through a command line interface without a card of a type corresponding to the request being inserted into one of the plurality of slots.

4. The method of claim 3, further comprising the operator determining whether the power capacity of the network element supports a particular configuration of line cards and/or service cards without those cards being inserted into the network element.

5. A method for power management of a network element having a plurality of slots for receiving a plurality of networking cards respectively, wherein the plurality of slots include one or more slots designated for one or more control cards and one or more slots designated for one or more line cards or service cards, the method comprising:

receiving a networking card configuration request for a type of networking card irrespective of a networking card of that type being inserted into one of the plurality of slots, wherein the networking card is not enabled unless successfully configured and inserted into the network element;

determining an amount of power that type of networking card consumes when configured without reading a power consumption value from a networking card of that type;

determining whether allowing that type of networking card to be configured would exceed a power capacity of the network element, wherein if the power capacity is exceeded, denying the configuration request of that type of networking card, and wherein if the power capacity is not exceeded, performing the following:

accepting the configuration request of that type of networking card, and allocating the amount of power that type of networking card consumes; and upon detecting an active control card being inserted into one of the one or more slots designated for the one or more control cards, performing the following:

determining that active control card's type, determining an amount of power that the active control card requires and allocating from the power capacity that amount of power, and for each remaining control card slot, reserving an amount of power from the power capacity equal to the amount of power required by the active control card; and for each slot designated for the one or more line cards or service cards, reserving a power minimum from the power capacity if no configured card is inserted into the slot, wherein a non-configured card inserted into the slot does not impact the power capacity.

6. The method of claim 5, further comprising upon successful configuration of a line card or service card to be inserted into one of the one or more slots designated for one or more line cards or service cards, modifying the power capacity to reflect an amount of power required for that line card or service card.

7. The method of claim 5, wherein the determining the amount of power that type of networking card consumes when configured includes accessing a data structure stored on the network element containing power consumption values for types of networking cards supported by the network element.

8. The method of claim 5, wherein the networking card configuration request originates from an operator of the network element through a command line interface without a card of a type corresponding to the request being inserted into one of the plurality of slots.

9. A network element to perform power management including preventing the network element from exceeding an electrical capacity of the network element, the network element comprising:

a chassis including a plurality of slots to receive a plurality of networking cards respectively, the plurality of slots including one or more slots dedicated to receive one or more control cards and one or more slots dedicated to receive one or more line cards or service cards, wherein the chassis has a power capacity; and a first control card inserted into one of the one or more slots dedicated to receive the one or more control cards, the first control card including:

a chassis power management initialization module to:

determine an amount of power consumed by the first control card, determine an amount of power required for low power mode of supported line cards, allocate the amount of power consumed by the first control card, and reserve the amount of power required for the low power mode of the supported line cards for each of the one or more slots dedicated to receive the one or more line cards or service cards, and a card configuration module to receive a card configuration request for a type of networking card irrespective of a networking card of that type being inserted into one of the plurality of slots, and determine whether allowing that type of networking card would exceed the electrical capacity of the network element.

10. The network element of claim 9, wherein the first control card further includes the card configuration module to prevent the line cards or service cards from being powered up unless successfully configured.

11. The network element of claim 10, further comprising:

a memory to store a chassis power management inventory that maintains power consumption values of networking cards supported by the network element; and wherein the determine whether allowing that type of networking card would exceed the electrical capacity of the network element includes:

the card configuration module to access the chassis power management inventory to determine a power consumption value of a networking card of the type requested for configuration and compare that power consumption value with the amount of power available in the network element, wherein the card configuration module is to accept the configuration if the power consumption value is less than the amount of power available in the network element.

12. The network element of claim 10, wherein the first control card further includes a command line interface module to receive the card configuration request from an operator of the network element, wherein the card configuration request includes a configuration request for a card that is not inserted into any of the plurality of slots of the chassis.

13. The network element of claim 10, wherein the chassis includes at least one slot dedicated to receive a second control card that is a standby control card, and wherein the chassis power management initialization module further is to allocate the amount of power consumed by the first control card for the slot dedicated to receive the second control card.

14. The network element of claim 10, wherein the control card further includes a chassis power capacity exceeded recovery module to transition one or more configured line cards or service cards to a powered down state to reduce the network element's power load when the power capacity is exceeded.

15. A non-transitory machine-readable storage medium that provides instructions that, if executed by a processor, will cause said processor to perform operations for power management of a network element having a plurality of slots for receiving a plurality of networking cards respectively and wherein the plurality of slots include one or more slots designated for one or more control cards and one or more slots designated for one or more line cards or service cards, the operations comprising:

receiving a networking card configuration request for a type of networking card irrespective of a networking card of that type being inserted into one of the plurality of slots, wherein the networking card is not enabled unless successfully configured and inserted into the network element;

determining an amount of power that type of networking card consumes when configured without reading a power consumption value from a networking card of that type;

determining whether allowing that type of networking card to be configured would exceed a power capacity of the network element, wherein if the power capacity is exceeded, denying the configuration request of that type of networking card, and wherein if the power capacity is not exceeded, performing the following:
  accepting the configuration request of that type of networking card, and
  allocating the amount of power that type of networking card consumes;

determining power consumption of the networking cards has exceeded the power capacity of the network element;

upon determining the power consumption of the networking cards has exceeded the power capacity of the network element, powering down enough of one of the one or more line cards or service cards to reduce the power consumption below the power capacity;

preventing configuration of any line cards or service cards while at least one of the line cards or service cards is in a powered down state; and
  upon determining that power has become available, powering up the powered down cards.

16. The non-transitory machine-readable storage medium of claim 15, wherein determining the amount of power that type of networking card consumes when configured includes accessing a data structure stored on the network element containing power consumption values for types of networking cards supported by the network element.

17. The non-transitory machine-readable storage medium of claim 15, wherein the networking card configuration request originates from an operator of the network element through a command line interface without a card of a type corresponding to the request being inserted into one of the plurality of slots.

18. The non-transitory machine-readable storage medium of claim 17, further comprising the operator determining whether the power capacity of the network element supports a particular configuration of line cards and/or service cards without those cards being inserted into the network element.

19. A non-transitory machine-readable storage medium that provides instructions that, if executed by a processor, will cause said processor to perform operations for power management of a network element having a plurality of slots for receiving a plurality of networking cards respectively and wherein the plurality of slots include one or more slots designated for one or more control cards and one or more slots designated for one or more line cards or service cards, the operations comprising:

receiving a networking card configuration request for a type of networking card irrespective of a networking card of that type being inserted into one of the plurality of slots, wherein the networking card is not enabled unless successfully configured and inserted into the network element;

determining an amount of power that type of networking card consumes when configured without reading a power consumption value from a networking card of that type;

determining whether allowing that type of networking card to be configured would exceed a power capacity of the network element, wherein if the power capacity is exceeded, denying the configuration request of that type of networking card, and wherein if the power capacity is not exceeded, performing the following:
  accepting the configuration request of that type of networking card, and
  allocating the amount of power that type of networking card consumes; and upon detecting an active control card being inserted into one of the one or more slots designated for the one or more control cards, performing the following:

determining that active control card's type,
  determining an amount of power that the active control card requires and allocating from the power capacity that amount of power, and
  for each remaining control card slot, reserving an amount of power from the power capacity equal to the amount of power required by the active control card; and
  for each slot designated for the one or more line cards or service cards, reserving a power minimum from the power capacity if no configured card is inserted into the slot, wherein a non-configured card inserted into the slot does not impact the power capacity.

20. The non-transitory machine-readable storage medium of claim 19, further comprising upon successful configuration of a line card or a service card to be inserted into one of the one or more slots designated for one or more line cards or service cards, modifying the power capacity to reflect an amount of power required for that line card or service card.

21. The non-transitory machine-readable storage medium of claim 19, wherein determining the amount of power that type of networking card consumes when configured includes accessing a data structure stored on the network element containing power consumption values for types of networking cards supported by the network element.

22. The non-transitory machine-readable storage medium of claim 19, wherein the networking card configuration request originates from an operator of the network element through a command line interface without a card of a type corresponding to the request being inserted into one of the plurality of slots.

* * * * *